United States Patent [19]

Kawagoe et al.

[11] 3,828,209

[45] Aug. 6, 1974

[54] FLIP-FLOP CIRCUIT

[75] Inventors: Hiroto Kawagoe; Kosei Nomiya, both of Tokyo, Japan

[73] Assignee: Hitachi, Ltd., Tokyo, Japan

[22] Filed: Jan. 29, 1973

[21] Appl. No.: 327,699

[52] U.S. Cl. .................. 307/279, 307/251, 307/303

[51] Int. Cl. .......................................... H03k 17/00

[58] Field of Search ..................... 307/279, 251, 303

[56] References Cited

UNITED STATES PATENTS

| | | | |
|---|---|---|---|
| 3,483,400 | 12/1969 | Washizuka et al. | 307/279 |
| 3,599,018 | 8/1971 | Washizuka et al. | 307/279 |

*Primary Examiner*—Rudolph V. Rolinec
*Assistant Examiner*—B. P. Davis
*Attorney, Agent, or Firm*—Craig & Antonelli

[57] ABSTRACT

A static flip-flop circuit constructed of field-effect transistors, wherein a static section comprises a field-effect transistor which allows an information to be held during its conductive state and a new information to be written during its non-conductive state and which dispenses with a transfer gate otherwise included in a feedback path of such static section, so that the likelihood of an erroneous operation attributable to charge sharing is eliminated.

10 Claims, 4 Drawing Figures

FLIP-FLOP CIRCUIT

BACKGROUND OF THE INVENTION

1. Field of the Invention

The present invention relates to a flip-flop circuit, and more particularly to a static flip-flop circuit employing field-effect transistors.

2. Description of the Prior Art

Flip-flop circuits constituted of insulated gate field-effect transistors are broadly classified into the dynamic flip-flop circuit and the static flip-flop circuit. Although the former is simple in construction, the latter is sometimes more preferable in consideration of its retention of information.

FIG. 1 shows a prior art static flip-flop circuit constructed of field-effect transistors.

The flip-flop circuit in the figure comprises the first inverter circuit composed of transistors $T_{11}$ and $T_{12}$, the second inverter circuit composed of transistors $T_{14}$ and $T_{15}$, the third inverter circuit composed of transistors $T_{16}$ and $T_{17}$, and transistors $T_{13}$, $T_{18}$ and $T_{19}$ for transfer gates. The second inverter circuit and the third inverter circuit are connected in cascade. An output terminal of the third inverter circuit is connected for feedback with an input terminal of the second inverter circuit through the transistor for the transfer gate $T_{18}$. Information is retained by the feedback loop. Contents of the information retained within the above feedback loop depend on the state of that output of the first inverter circuit at the time of conduction of the transistor for the transfer gate $T_{13}$. A clock signal $\phi_2$ is applied to the gate electrodes of the transistors $T_{18}$ and $T_{19}$, while a clock control signal $\phi_1$ differing in phase from the signal $\phi_2$ is applied to the gate electrode of the transistor $T_{13}$.

Here, the flip-flop circuit drives the load transistors $T_{12}$, $T_{15}$ and $T_{17}$ with a DC supply voltage $V_{DD}$. In case where, in order to render the power consumption low, the transistors are driven by clock pulses, the problem of charge sharing arises as will be stated hereunder.

By way of example, it is assumed that the transistor $T_{12}$ is driven by the clock control signal $\phi_1$, while the transistors $T_{15}$ and $T_{17}$ are driven by the clock signal $\phi_2$. An electric potential impressed on the gate electrode of the transistor $T_{14}$ before the transistor $T_{13}$ is turned on by the clock control signal $\phi_1$ to thereby write a new information into the feedback loop, is supposed to be ground potential. Accordingly, no charge is held stored in the gate capacity $C_1$ of the transistor $T_{14}$ and a capacity $C_2$ formed by the wiring capacity between the transistors $T_{16}$ and $T_{18}$ and so forth. Subsequently, the new information is written, the gate capacity $C_1$ of the transistor $T_{14}$ is charged, and the potential of the gate electrode reaches V. Then, when the transistor $T_{18}$ is turned on by the clock signal $\phi_2$, the gate potential of the transistor $T_{14}$ lowers to $V \cdot C_1/(C_1 + C_2)$, and hence, it is feared that the transistor $T_{14}$ is prevented from operating satisfactorily. The phenomenon becomes the cause of an erroneous operation, and imposes restrictions on the value of the wiring capacity $C_2$.

SUMMARY OF THE INVENTION

An object of the present invention is to provide a static flip-flop circuit which is constituted of field-effect transistors and for which both the DC drive and the clock drive are possible.

According to the present invention, there is provided a flip-flop circuit comprising a static section which is composed of the first field-effect transistor connected to the first load resistance means, the second field-effect transistor connected to the second load resistance means, and the third field-effect transistor connected in series with the second field-effect transistor, and in which an output electrode of the first field-effect transistor is connected to an input electrode of either one of the second and third field-effect transistors, while the second pulse signal is applied to an input electrode of the other, and an output electrode of the second field-effect transistor is connected for feedback to an input electrode of the first field-effect transistor. In addition to the static section, the flip-flop circuit comprises the fourth field-effect transistor for a transfer gate, which is connected between an input signal source and the input electrode of the first field-effect transistor of the static section and which has the first pulse signal applied to its input electrode. The above-mentioned first and second pulse signals differ in phase from each other.

With the flip-flop circuit of such construction, information can be always stored in the static section. Writing of a new information is performed in such a way that the fourth field-effect transistor for the transfer gate is turned on by the first pulse signal, to apply an input signal to the input electrode of the first field-effect transistor. It will become apparent from the following description of the preferred embodiments that both the DC drive and the clock drive are possible.

PREFERRED EMBODIMENTS OF THE INVENTION

Referring now to the accompanying drawings, the flip-flop circuit according to the present invention will be described.

Figure 2:
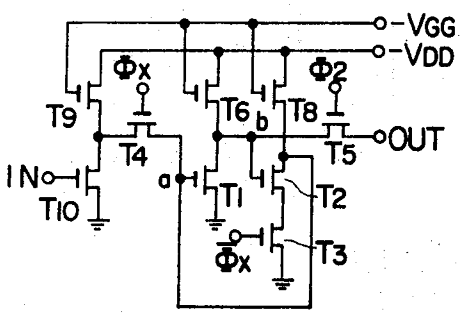
FIG. 2 is a circuit diagram of a static flip-flop circuit with DC drive according to the present invention.

FIG. 2 is a schematic circuit diagram of a static flip-flop circuit constructed of field-effect transistors, and illustrates a case where load transistors are driven by DC power sources.

In the figure, transistors $T_6$, $T_8$ and $T_9$ function as load resistances. A DC source voltage $-V_{GG}$ is applied to each gate electrode, while a DC source voltage $-V_{DD}$ is applied to each drain electrode.

The drain electrodes of transistors $T_1$ and $T_2$ are connected to the source electrodes of the load transistors $T_6$ and $T_8$, respectively. The source electrode of the transistor $T_1$ is grounded, but that of the transistor $T_2$ has the drain electrode of a transistor $T_3$ connected thereto. The source electrode of the transistor $T_3$ is grounded. An output electrode of the transistor $T_1$, namely, the drain electrode thereof is connected to an input electrode of the transistor $T_2$, namely, the gate electrode thereof. The output electrode of the transistor $T_2$ is feedback-connected to the input electrode of the transistor $T_1$.

Transistors $T_9$ and $T_{10}$ constitute an inverter circuit, whose output signal is applied through a transistor for a transfer gate $T_4$ to the input electrode of the transistor $T_1$.

A transistor $T_5$ is used as a transistor for a transfer gate which, when rendered conductive, transmits an output signal of an inverter circuit constituted of the transistors $T_1$ and $T_6$ to an output terminal OUT.

To the input electrode or gate electrode of the transistor $T_4$, a clock control signal $\phi_x$ is applied. To the gate electrode of the transistor $T_3$, the inverted signal $\overline{\phi}_x$ of the above signal is applied. To the gate electrode of the transistor $T_5$, a clock signal $\phi_2$ is applied.

The operation of the flip-flop circuit of the embodiment will now be explained with reference to a time chart in FIGS. *3a* to *3g*.

FIG. *3a* represents the clock signal $\phi_2$; FIG. *3b* represents an input signal applied to an input terminal IN; FIGS. *3c* and *3d* represent the clock control signals $\phi_x$ and $\overline{\phi}_x$, respectively; FIGS. *3e* and *3f* represent electric potentials at points *a* and *b* in FIG. 2, respectively; and FIG. *3g* represents an electric potential at the output terminal OUT. In the time chart, the upper level of each signal indicates ground potential, and the lower level a predetermined negative potential. Although the respective transistors will be explained as being the P-channel field-effect transistors which are rendered conductive upon application of a predetermined negative potential to the gate electrodes, it is a matter of course that the present invention is not restricted thereto.

Briefly stated, the operation of the flip-flop circuit in FIG. 2 is as follows. While the transistor $T_3$ is kept conductive, an information is statically held by the feedback circuit including the transistors $T_1$, $T_2$ and $T_3$. Next, when a new information is written into the feedback circuit, that is when the clock control signal $\phi_x$ falls to the negative potential so as to render the transfer gate transistor $T_4$ conductive, the transistor $T_3$ on which the inverted signal of the above signal is impressed becomes non-conductive. An electric potential impressed on the gate electrode of the transistor $T_1$ is forced into the output potential of the transistor $T_{10}$ independent of the previous state. In this way, the new information is written into the aforesaid feedback circuit. It is statically held in the feedback circuit until the transfer gate transistor $T_4$ is thereafter rendered conductive again to thus effect the next writing.

Figures 3A, 3B, 3C, 3D, 3E, 3F, 3G:
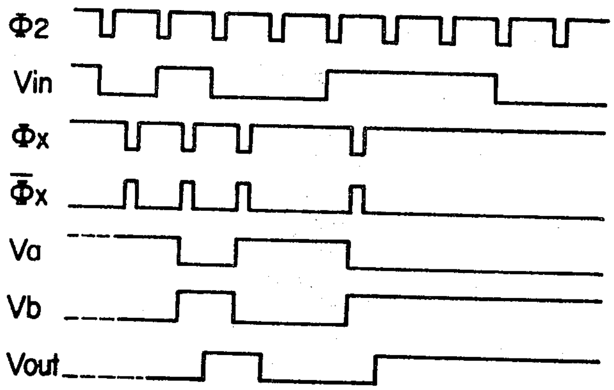
FIG. 3 is a time chart for the flip-flop circuit in FIG. 2 and the flip-flop circuit in FIG. 4.

As understood from the time chart in FIG. 3, the potential $V_a$ of the gate electrode of the transistor $T_1$ (the potential of the point *a*) becomes the potential of the inverted signal of the input signal $V_{in}$ when the clock control signal $\phi_x$ falls into the negative potential, and holds the state until the clock control signal $\phi_x$ is subsequently brought into the negative potential again. The output potential of the transistor $T_1$, namely, the potential $V_b$ of the point *b* is merely the inverted one of the potential $V_a$ of the point *a*. The output potential $V_{out}$ is delayed with respect to the potential $V_b$ of the point *b* by the clock signal $\phi_2$.

Figure 4:
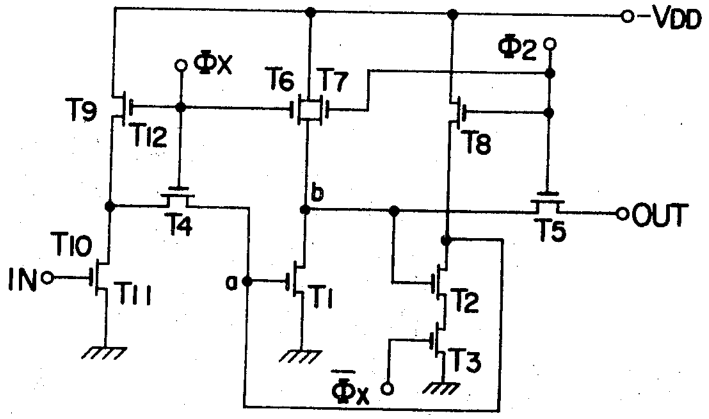
FIG. 4 shows the static flip-flop circuit of the clock drive according to the present invention.

Referring now to FIG. 4, description will be made of a static flip-flop circuit in which load transistors are subjected to the clock drive.

In FIG. 4, the same parts as in FIG. 2 are designated by the same symbols.

In the embodiment in FIG. 4, the gate electrode of the load transistor $T_9$ has the clock control signal $\phi_x$ supplied thereto. The gate electrode of the load transistor $T_6$ has the clock control signal $\phi_x$ similarly supplied thereto. A load transistor $T_7$ is connected in parallel with the load transistor $T_6$. The gate electrodes of the load transistors $T_7$ and $T_8$ have the clock signal $\phi_2$ supplied thereto.

The operations of the load transistors with the predetermined clock signals thus applied to their gate electrodes, are as follows.

When the clock control signal $\phi_x$ falls into the negative potential, the load transistor $T_9$ is rendered conductive, and the output potential of the transistor $T_{10}$ is determined. The load transistor $T_{10}$ is low in power consumption since it is rendered conductive only when a new information is written, that is, only when the clock control signal $\phi_x$ becomes negative.

The load transistor $T_6$ is similarly rendered conductive at the writing of the new information, to determine the potential of the point *b*. In the case where, at the writing of an information, the ground potential of the new information is transmitted through the transfer gate transistor $T_4$ to the point *a*, and yet, the point *b* is at the ground potential of an old information, the state of the flip-flop circuit is not definitely settled. The load transistor $T_6$ is used in order to avoid the inconvenience. More specifically, the transistor $T_1$ is non-conductive and the load transistor $T_6$ is conductive in this case, so that the potential of the point *b* is rewritten from the ground potential of the old information to the negative potential of the new information.

The load transistor $T_7$ is rendered conductive when the clock signal $\phi_2$ falls to negative potential. It determines the potential of the point *b*. In the case where the period of the clock control signal $\phi_x$ is long, that is, where the interval of the writing of an information is large, charges accumulated in the gate capacity of the transistor $T_2$ are gradually lost, which constitutes a cause of an erroneous operation. In order to avoid the inconvenience, the load transistor $T_7$ charges the gate capacity of the transistor $T_2$ at the period of the clock signal $\phi_2$.

The transistor $T_8$ is similarly rendered conductive when the clock signal $\phi_2$ is brought to negative potential. The output potential of the transistor $T_2$ is thereby determined.

Figure 1:
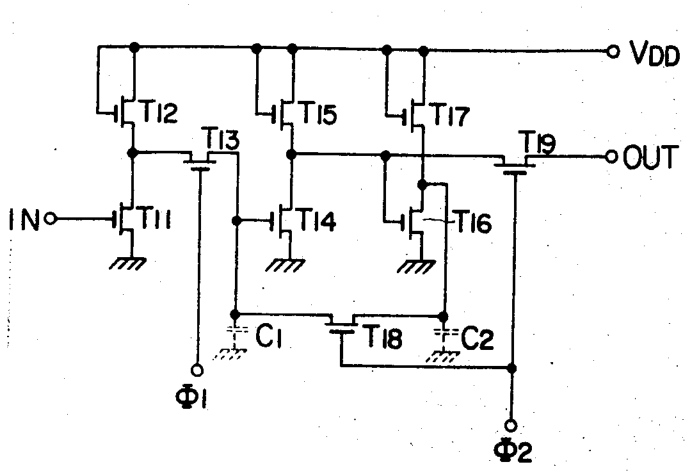
FIG. 1 is a circuit diagram of the prior art static flip-flop circuit which has been explained previously.

In accordance with the flip-flop circuit of such construction, the transfer gate transistor $T_{18}$ is not incorporated into the feedback path as is done in FIG. 1, that is, the capacity is not divided into the components $C_1$ and $C_2$ by the transfer gate transistor $T_{18}$ as is done in FIG. 1, so that any erroneous operation due to the aforesaid charge sharing does not take place. Therefore, not only the DC drive, but also the clock drive is also possible.

While, in the above, the present invention has been described in conjunction with the embodiments, it is not restricted to them but it allows a variety of modifications.

For example, the clock control signal $\overline{\phi}_x$ may be applied to the gate electrode of the transistor $T_2$, while the output electrode of the transistor $T_1$ may be connected to the gate electrode of the transistor $T_3$. A pulse signal differing in phase from the clock control signal $\phi_x$, e.g., the clock signal $\phi_2$ may be fed to the gate electrode of the transistor $T_2$ or $T_3$. The clock control signal may be a clock signal obtained by delaying the phase of the clock signal $\phi_2$, or may be a signal obtained by taking a logic result between the clock signal and another pulse signal. The output signal may be derived, not only from the point *b*, but also from the output electrode of the transistor $T_2$ through the transfer gate transistor $T_5$. Various sorts of logical gate circuits, such as inverter circuits, may be connected between the foregoing feedback circuit or static section and the transfer gate transistors $T_4$ and $T_5$.

What is claimed is:

1. A flip-flop circuit comprising a first field-effect transistor connected to first load resistance means, a second field-effect transistor connected to second load resistance means, a third field-effect transistor connected in series with said second field-effect transistor, a transfer gate including a fourth field-effect transistor connected between an input signal source and an input electrode of said first field-effect transistor, means for applying a first pulse signal to an input electrode of said fourth field-effect transistor, an output electrode of said first field-effect transistor being connected to an input electrode of one of said second and third field-effect transistors, means for applying a second pulse signal different in phase from said first pulse signal to an input electrode of the other of said second and third field-effect transistors, and substantially zero impedance means for feedback-connecting an output electrode of said second field-effect transistor directly to said input electrode of said first field-effect transistor.

2. A flip-flop circuit according to claim 1, further including an additional transfer gate including a fifth field-effect transistor connected to said output electrode of one of said first and second field-effect transistors, means for applying a third pulse signal different in phase from said first pulse signal to an input electrode of said fifth field-effect transistor.

3. A flip-flop circuit comprising a first field-effect transistor connected to first load resistance means, a second field-effect transistor connected to second load resistance means, a third field-effect transistor connected in series with said second field-effect transistor, a transfer gate including a fourth field-effect transistor connected between an input signal source and an input electrode of said first field-effect transistor, means for applying a first pulse signal to an input electrode of said fourth field-effect transistor, an output electrode of said first field-effect transistor being connected to an input electrode of one of said second and third field-effect transistors, means for applying a second pulse signal different in phase from said first pulse signal to an input electrode of the other of said second and third field-effect transistors, an output electrode of said second field-effect transistor being connected for feedback to said input electrode of said first field-effect transistor, an additional transfer gate including a fifth field-effect transistor connected to said output electrode of one of said first and second field-effect transistors, means for applying a third pulse signal different in phase from said first pulse signal to an input electrode of said fifth field-effect transistor, said first load resistance means comprising sixth and seventh field-effect transistors which are connected in parallel with each other and whose input electrodes are respectively connected to receive said first and third pulse signals.

4. A flip-flop circuit according to claim 3 wherein said second load resistance means comprises an eighth field-effect transistor whose input electrode is connected to receive said third pulse signal.

5. A flip-flop circuit according to claim 4 wherein the drain electrode of said first field-effect transistor is connected to the gate electrode of said second field-effect transistor.

6. A flip-flop circuit according to claim 5 wherein said fifth field-effect transistor is connected to the output electrode of said first field-effect transistor.

7. A flip-flop circuit according to claim 1 wherein said first and second load resistance means comprise respective fifth and sixth field-effect transistors.

8. A flip-flop circuit according to claim 1 wherein said input signal source includes an inverter circuit formed by fifth and sixth field-effect transistors connected in series.

9. A flip-flop circuit comprising:
- a first load means;
- a first insulated gate type field-effect transistor connected with said first load means;
- a second load means;
- series connected second and third insulated gate type field-effect transistors connected with said second load means;
- a fourth insulated gate type field-effect transistor connected between an input signal source and a gate electrode of said first field-effect transistor;
- substantially zero impedance means for connecting an output electrode of said first transistor with a gate electrode of one of said second and third transistors;
- substantially zero impedance means for connecting an output electrode of said series connected second and third transistors with the gate electrode of said first transistor;
- means for supplying a first pulse signal to a gate of said fourth transistor; and
- means for supplying a second pulse signal to a gate of the other of said second and third transistors.

10. A flip-flop circuit comprising:
- a first and a second voltage line; a first load means one electrode of which is connected to said first voltage line;
- a first insulated gate type field-effect transistor connected between said second voltage line and the other electrode of said first load means;
- a second load means one electrode of which is connected to said first voltage line;
- series connected second and third insulated gate type field-effect transistors connected between said second voltage line and the other electrode of said second load means;
- a fourth insulated gate type field-effect transistor connected between an input signal source and a gate electrode of said first field-effect transistor;
- substantially zero impedance means for connecting an output electrode of said first transistor with a gate electrode of one of said second and third transistors;
- substantially zero impedance means for connecting an output electrode of said series connected second and third transistors with the gate electrode of said first transistor;
- means for supplying a first pulse signal to a gate of said fourth transistor; and
- means for supplying a second pulse signal to a gate of the other of said second and third transistors.

* * * * *